US009226306B2

(12) United States Patent
Zhou et al.

(10) Patent No.: US 9,226,306 B2
(45) Date of Patent: Dec. 29, 2015

(54) SWITCHING OF USERS BETWEEN CO-EXISTENCE WIRELESS SYSTEMS (71) Applicant: QUALCOMM Incorporated, San Diego, CA (US)

(72) Inventors: Yan Zhou, San Diego, CA (US); Andrei Dragos Radulescu, San Diego, CA (US); Peerapol Tinnakornsrisuphap, San Diego, CA (US); Jay Kumar Sundararajan, San Diego, CA (US); Arnaud Meylan, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/785,993

(22) Filed: Mar. 5, 2013

(65) Prior Publication Data
US 2014/0113631 A1 Apr. 24, 2014

Related U.S. Application Data (60) Provisional application No. 61/716,999, filed on Oct. 22, 2012.

(51) Int. Cl.
H04W 36/00 (2009.01)
H04W 72/10 (2009.01)
(Continued)

(52) U.S. Cl.
CPC ............. *H04W 72/10* (2013.01); *H04L 45/028* (2013.01); *H04W 36/00* (2013.01);
(Continued)

(58) Field of Classification Search
CPC ............................... H04L 29/06; H04W 48/08

USPC ................ 455/436, 517, 447, 418, 411, 444, 455/414.1, 450, 434, 522, 424; 370/328, 370/338, 331, 252, 336
See application file for complete search history.

(56) References Cited

U.S. PATENT DOCUMENTS 7,457,621 B2 11/2008 Zhang
7,949,812 B1 5/2011 Wong et al.
(Continued)

FOREIGN PATENT DOCUMENTS

EP 1227695 A1 7/2002
EP 1983789 A1 10/2008
(Continued)

OTHER PUBLICATIONS

International Search Report and Written Opinion—PCT/US2013/066203—ISA/EPO—Mar. 6, 2014.
(Continued)

Primary Examiner — Kiet Doan
(74) Attorney, Agent, or Firm — Fariba Yadegar-Bandari (57) ABSTRACT Techniques for switching user equipments (UEs) between wireless systems are disclosed. A UE may be located within the coverage of a plurality of wireless systems and may communicate with a first wireless system among the plurality of wireless systems. The plurality of wireless systems may include a WLAN system and a cellular system and/or may be part of a small cell. Metrics of the UE for the plurality of wireless systems may be determined. The metrics may be related to one or more of efficiency, service charge, service subscription, application type, or buffer size. Whether to switch the UE from the first wireless system to another wireless system may be determined based on the metrics. In one design, switching priorities of the UE for the plurality of wireless systems may be determined based on the metrics and may be used to determine whether to switch the UE.

25 Claims, 5 Drawing Sheets (51) Int. Cl.
*H04L 12/759* (2013.01)
*H04W 36/14* (2009.01)
*H04W 48/18* (2009.01)
*H04W 36/24* (2009.01)
*H04W 36/22* (2009.01)
*H04W 48/06* (2009.01)

(52) U.S. Cl.
CPC ......... *H04W 36/0022* (2013.01); *H04W 36/14* (2013.01); *H04W 36/22* (2013.01); *H04W 36/24* (2013.01); *H04W 48/06* (2013.01); *H04W 48/18* (2013.01); *H04W 36/0066* (2013.01)

(56) References Cited

U.S. PATENT DOCUMENTS

| | | | |
|---|---|---|---|
| 8,200,232 | B2 | 6/2012 | Lee et al. |
| 8,249,505 | B1 | 8/2012 | Goldner et al. |
| 8,504,055 | B2 | 8/2013 | Vikberg et al. |
| 2001/0012778 | A1 | 8/2001 | Eriksson et al. |
| 2004/0180660 | A1 | 9/2004 | Choi et al. |
| 2005/0066033 | A1* | 3/2005 | Cheston et al. ............... 709/225 |
| 2005/0070287 | A1* | 3/2005 | Cave et al. ................... 455/436 |
| 2005/0094560 | A1 | 5/2005 | Montes |
| 2006/0121901 | A1 | 6/2006 | Tanaka et al. |
| 2007/0280161 | A1 | 12/2007 | Rudrapatna et al. |
| 2008/0014957 | A1 | 1/2008 | Ore |
| 2008/0170497 | A1 | 7/2008 | Jeong et al. |
| 2008/0254797 | A1 | 10/2008 | Achtari et al. |
| 2009/0046665 | A1 | 2/2009 | Robson et al. |
| 2009/0088131 | A1 | 4/2009 | Gholmieh et al. |
| 2009/0175454 | A1* | 7/2009 | Watanabe et al. ............. 380/277 |
| 2009/0203375 | A1 | 8/2009 | Gisby et al. |
| 2009/0232088 | A1 | 9/2009 | Wisely |
| 2009/0318144 | A1 | 12/2009 | Thomas et al. |
| 2010/0128696 | A1 | 5/2010 | Fantini et al. |
| 2010/0220687 | A1 | 9/2010 | Reznik et al. |
| 2010/0227591 | A1 | 9/2010 | Park et al. |
| 2010/0240386 | A1 | 9/2010 | Hamabe et al. |
| 2010/0281519 | A1 | 11/2010 | Das et al. |
| 2011/0013559 | A1 | 1/2011 | Marin |
| 2011/0039562 | A1 | 2/2011 | Balasubramanian et al. |
| 2011/0093913 | A1 | 4/2011 | Wohlert et al. |
| 2011/0110520 | A1 | 5/2011 | Ness et al. |
| 2011/0176511 | A1 | 7/2011 | Sayeedi |
| 2011/0195714 | A1 | 8/2011 | Sawinathan |
| 2011/0244866 | A1 | 10/2011 | Yamamoto et al. |
| 2011/0263250 | A1 | 10/2011 | Mueck et al. |
| 2011/0312365 | A1* | 12/2011 | Hatano et al. ................. 455/517 |
| 2011/0320588 | A1 | 12/2011 | Raleigh |
| 2012/0014345 | A1 | 1/2012 | Faurie et al. |
| 2012/0026865 | A1 | 2/2012 | Fan et al. |
| 2012/0033658 | A1 | 2/2012 | Ganesan |
| 2012/0044804 | A1 | 2/2012 | Rahman et al. |
| 2012/0044897 | A1 | 2/2012 | Wager et al. |
| 2012/0100861 | A1 | 4/2012 | Zhang et al. |
| 2012/0122458 | A1 | 5/2012 | Jokinen et al. |
| 2012/0149351 | A1* | 6/2012 | Kalbag ......................... 455/418 |
| 2012/0178467 | A1 | 7/2012 | Fujii et al. |
| 2012/0196644 | A1 | 8/2012 | Scherzer et al. |
| 2013/0003590 | A1 | 1/2013 | Gage et al. |
| 2013/0016700 | A1 | 1/2013 | Yu et al. |
| 2014/0004862 | A1 | 1/2014 | Ekemark |
| 2014/0044003 | A1 | 2/2014 | Drazynski et al. |
| 2014/0071967 | A1 | 3/2014 | Velasco |
| 2014/0073317 | A1 | 3/2014 | Zhou et al. |
| 2014/0112169 | A1 | 4/2014 | Zhou |
| 2014/0112170 | A1 | 4/2014 | Zhou |
| 2014/0112306 | A1 | 4/2014 | Zhou |
| 2014/0113590 | A1 | 4/2014 | Meylan |

FOREIGN PATENT DOCUMENTS

| | | |
|---|---|---|
| EP | 2312902 A1 | 4/2011 |
| EP | 2437546 A1 | 4/2012 |
| EP | 2571311 A1 | 3/2013 |
| WO | 2005101889 A1 | 10/2005 |
| WO | 2006075937 A1 | 7/2006 |
| WO | 2009000696 A1 | 12/2008 |
| WO | 2009152738 A1 | 12/2009 |
| WO | 2010068155 A1 | 6/2010 |
| WO | 2010080056 A1 | 7/2010 |
| WO | 2011054089 A1 | 5/2011 |
| WO | 2011107886 A1 | 9/2011 |
| WO | 2012121757 A1 | 9/2012 |

OTHER PUBLICATIONS

Shrestha G., et al., "A Method to Estimate the Reliability of Expert Judgement", Session 10C2, IEEE Proceedings-1989 Southeastcon, pp. 152-157.

* cited by examiner

SWITCHING OF USERS BETWEEN CO-EXISTENCE WIRELESS SYSTEMS

The present application claims priority to provisional U.S. Application Ser. No. 61/716,999, entitled "METHOD AND APPARATUS FOR SUPPORTING WIRELESS COMMUNICATION VIA A SMALL CELL," filed Oct. 22, 2012, and incorporated herein by reference in its entirety.

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include one or more base stations that can support communication for one or more user equipments (UEs). A UE may communicate with a base station via the downlink and uplink. The downlink (or forward link) refers to the communication link from the base station to the UE, and the uplink (or reverse link) refers to the communication link from the UE to the base station.

Multiple wireless systems utilizing different radio technologies may be deployed in a given geographic area. Any number of UEs may be located with the geographic area. Each UE may support one or more of the radio technologies utilized by the multiple wireless systems. It may be desirable to efficiently support communication for the UEs via the multiple wireless systems.

SUMMARY

Techniques for switching UEs between different wireless systems are disclosed herein. The techniques may be used to switch a UE between a plurality of wireless systems that may be deployed in any manner. The techniques may be especially applicable for switching a UE between wireless systems of a small cell. A small cell may include an access point for a wireless local area network (WLAN) system and a femto cell for a cellular system. The small cell may perform certain control functions such as (i) switching of UEs between wireless systems of the small cell and (ii) possibly switching of UEs between the wireless systems of the small cell and wireless systems external to the small cell. A UE communicating with a wireless system (e.g., the WLAN system) in the small cell may be switched to another wireless system (e.g., the cellular system) in the small cell in order to obtain better performance. The UE may also be switched to a wireless system external to the small cell (e.g., a macro cell) if the wireless systems in the small cell cannot provide satisfactory performance for the UE. The small cell may control switching of UEs between wireless systems.

In one design, a UE located within the coverage of a plurality of wireless systems and communicating with a first wireless system among the plurality of wireless systems may be identified. Metrics of the UE for the plurality of wireless systems may be determined. The metrics may be related to at least one of efficiency, service charge, service subscription, application type, or buffer size. Whether to switch the UE from the first wireless system to another one of the plurality of wireless systems may be determined based on the metrics of the UE for the plurality of wireless systems. In one design, switching priorities of the UE for the plurality of wireless systems may be determined based on the metrics of the UE for the plurality of wireless systems. Whether to switch the UE from the first wireless system to another wireless system may be determined based on the switching priorities of the UE for the plurality of wireless systems and possibly based further on congestion in the first wireless system.

Various aspects and features of the disclosure are described in further detail below.

DETAILED DESCRIPTION

The techniques described herein may be used for various wireless communication systems such as CDMA, TDMA, FDMA, OFDMA, SC-FDMA and other wireless systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio technologies mentioned above as well as other wireless systems and radio technologies.

Figure 1:
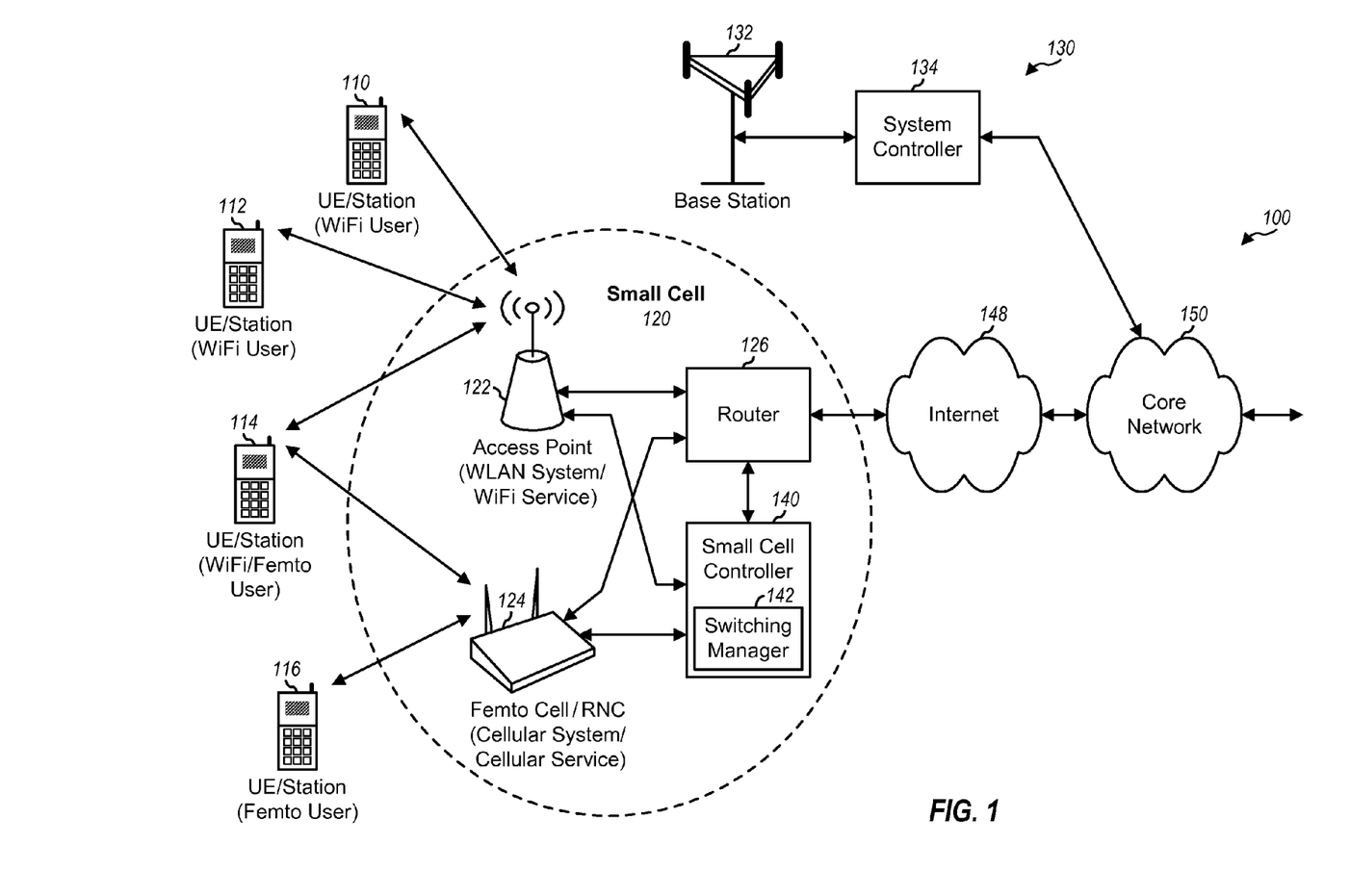
FIG. 1 shows an exemplary system deployment.

FIG. 1 shows an exemplary system deployment 100 in which various aspects of the present disclosure may be implemented. A small cell 120 may support communication for a small geographic area such as a home, an apartment, an office, a shop, etc. Small cell 120 may include an access point (AP) 122 supporting communication via a first radio technology and a femto cell 124 supporting communication via a second radio technology. Access point 122 may be part of a WLAN system providing WiFi service, and femto cell 124 may be part of a cellular system providing cellular service. A WLAN system is a wireless system supporting communication for a small geographic area, e.g., a home, an office, etc. A cellular system is a wireless system supporting communication for a large geographic area, e.g., a city, a state, a country, etc. Small cell 120 may thus support communication for multiple co-existence wireless systems, which are wireless systems with overlapping coverage and under the control of a common network entity. A network entity may be any entity that is not a UE and may also be referred to as a wireless node, etc.

Access point 122 may support a radio technology such as WiFi, Hiperlan, or some other WLAN radio technology. Access point 122 may support communication for a basic service set (BSS), which includes a set of stations that can communicate with each other. The BSS may also be referred to as a WLAN system.

Femto cell 124 may support a radio technology such as LTE, WCDMA, CDMA 1X, GSM, etc. Femto cell 124 may also be referred to as a home base station (HBS), a home access point (HAP), a home Node B (HNB), a home evolved Node B (HeNB), etc. Femto cell 124 may be configured to provide restricted access for a group of UEs, which may belong in a closed subscriber group (CSG). Femto cell 124 may allow a network operator to extend the coverage of a cellular system, to increase capacity, and/or to obtain other advantages. Femto cell 124 may be considered as part of the cellular system and may communicate with other network entities in the cellular system. Femto cell 124 may operate as described in 3GPP TR 25.820, entitled "3G Home NodeB Study Item Technical Report," which is publicly available. Femto cell 124 may also operate as described in documents for other radio technologies. Femto cell 124 may include a radio network controller (RNC), which may perform some functions normally performed by an RNC in a cellular system.

Access point 122 and femto cell 124 may be coupled to a router 126, which may be coupled to the Internet 148 or some other data network. Router 126 may route traffic data between access point 122 and femto cell 124 and other entities. Access point 122 and femto cell 124 may further be coupled to a small cell controller 140, which may perform coordination and control functions for these entities. Small cell controller 140 may include various modules to perform coordination and control functions, such as a switching manager 142 that can switch UEs between the WLAN system and the cellular system in small cell 120. Small cell controller 140 may communicate with entities in a core network 150, which may include various network entities supporting communication and other services for UEs.

In an exemplary design, small cell 120 may be a physical hardware module or unit (e.g., a commercially available product), which may be purchased by a user and installed in a home, an apartment, etc. The hardware module for small cell 120 may include a first module (e.g., an integrated circuit (IC) chip or a circuit board) for access point 122, a second module for femto cell 124, a third module for router 126, and a fourth module for small cell controller 140. The fourth module for small cell controller 140 may include a memory storing various software modules, one of which may be switching manager 142. In general, small cell 120 may include any number of hardware modules. Each hardware module may perform any set of functions and may support access point 122, or femto cell 124, or router 126, or small cell controller 140, or a combination thereof. The functions of each of access point 122, femto cell 124, router 126, and small cell controller 140 may be implemented in software and/or hardware on one or more hardware modules of small cell 120.

A base station 132 may support communication for a relatively large geographic area, e.g., up to 10 kilometer (Km) in radius. A coverage area of base station 132 and/or a base station subsystem serving this coverage area may be referred to as a macro cell. Base station 132 may be part of a cellular system 130, which may include other base stations not shown in FIG. 1 for simplicity. Cellular system 130 may support the same radio technology as femto cell 124 or a different radio technology. Base station 132 may couple to a system controller 134, which may provide coordination and control for base station 132 and other base stations. System controller 134 may further couple to core network 150.

UEs 110 to 116 may be dispersed throughout the coverage area of small cell 120, and each UE may be stationary or mobile. A UE may also be referred to as a mobile station, a terminal, an access terminal, a subscriber unit, a station (STA), etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with access point 122 and/or femto cell 124 in small cell 120. A UE may also be able to communicate with base station 132 in cellular system 130. A UE may be referred to as a station (e.g., when communicating with access point 122), a user, etc.

As shown in FIG. 1, small cell 120 may include co-located access point 122 providing WLAN service and femto cell 124 providing cellular service. Any number of UEs (i.e., stations or users) may be located within the coverage of small cell 120. Each UE may support only WLAN service, or only cellular service, or both WLAN and cellular services. Any number of UEs in small cell 120 may be active at any given moment. The active UEs may have different capabilities and/or data requirements. Furthermore, the active UEs may observe different channel conditions for access point 122 and femto cell 124. It may be desirable to efficiently serve the active UEs in small cell 120.

In an aspect of the present disclosure, techniques for switching UEs between different wireless systems are disclosed. A UE may be served by one wireless system (e.g., a WLAN system) in a small cell but may have poor performance via this wireless system. The UE may be switched to another wireless system (e.g., a cellular system) in the small cell in order to obtain better performance. The UE may also be switched to a wireless system external to the small cell (e.g., a macro cell) if the wireless systems in the small cell cannot provide satisfactory performance for the UE.

Switching of UEs between the WLAN system and the cellular system in the small cell may be performed based on various factors. The factors may comprise and/or may be referred to as conditions, attributes, criteria, events, etc. The factors may be used as (i) a trigger to consider switching UEs between wireless systems and/or (ii) a parameter to select suitable wireless systems to switch the UEs. The factors may be quantified by metrics. The metrics may be used to decide whether or not to switch the UEs and to possibly select suitable wireless systems to switch the UEs. For example, congestion in a first wireless system may be a factor used to switch UEs from the first wireless system to a second wireless system. Congestion may be quantified by one or more metrics. UEs may be switched if the metric(s) indicate that the first wireless system is sufficiently congested, the UEs contributed to congestion in the first wireless system, and the second wireless system is less congested than the first wireless system. As another example, efficiency of a UE for each wireless system may be a factor used to switch the UE between wireless systems. Efficiency may be quantified by one or more metrics. The UE may be assigned a higher priority for switching to a wireless system in which the UE has higher efficiency.

A given UE X may be served by a serving system in the small cell and may be switched from the serving system to another wireless system based on various factors. In one design, UE X may be switched from the serving system to another wireless system based on one or more of the following factors:

A1. Serving system is congested, e.g., running out of resources,
A2. UE has poor channel quality for the serving system,
A3. UE has unsatisfactory data performance via the serving system,
A4. UE has high service charge/usage on the serving system,
A5. UE experiences strong interference communicating with the serving system,
A6. UE has poor efficiency for the serving system, and
A7. Other factors.

UE X may be switched from the serving system to another wireless system when triggered by any of the factors described above. Switching of UE X may be determined by taking into account the ability of the serving system to serve UE X, the performance of UE X on the serving system, and/or other attributes of UE X with respect to the serving system. Switching of UE X may also be determined by taking into account the capabilities of UE X with respect to each available wireless system, the ability of other wireless systems to serve UE X, etc.

Some or all of the factors described above may be applicable for a given wireless system. In particular, some factors may be applicable for both the WLAN system and the cellular system in the small cell, some factors may be applicable for only the WLAN system, and some factors may be applicable for only the cellular system. Furthermore, a given factor may be defined in different manners for different wireless systems. For example, different wireless systems may be associated with resources of different types. Hence, congestion may be defined in different manners for different wireless systems.

In one design, UE X may be switched from the cellular system to the WLAN system in the small cell based on one or more of the following factors:

B1. Cellular system is congested, e.g., running out of resources,
B2. UE has poor channel quality for the cellular system,
B3. UE has unsatisfactory data performance via the cellular system,
B4. UE has high service charge/usage on the cellular system, and
B5. Other factors.

Congestion in the cellular system may result from lack of resources in the cellular system to serve UEs. Resources in the cellular system may include radio resources, hardware resources, backhaul resources, etc. The available radio resources in the cellular system may be dependent on the particular radio technology utilized by the cellular system. For example, the available radio resources in a CDMA system may be quantified by the number of orthogonal codes available for each of the downlink and uplink, the amount of transmit power available for the downlink, the amount of interference observed on the uplink, etc. The available radio resources in an LTE system may be quantified by the number of resource blocks available for each of the downlink and uplink, the number of spreading codes available for the uplink, etc. Hardware resources may be quantified by the number of downlink channel elements available at a femto cell to process downlink signals sent to UEs, the number of uplink channel elements available at the femto cell to process uplink signals sent by UEs, etc. Backhaul resources may be quantified by the capacity or data rate of a backhaul link from the femto cell toward the core network or the Internet.

Congestion in the cellular system may be quantified based on various metrics such as transmit power on the downlink, received signal strength indicator (RSSI) on the uplink, available resource blocks for each of the downlink and uplink, available orthogonal codes for each of the downlink and uplink, available channel elements in a femto cell, etc. Congestion may be indicated when downlink transmit power or uplink RSSI is above a threshold. Congestion in the cellular system may also be quantified based on other metrics related to radio resources, hardware resources, and/or backhaul resources in the cellular system.

Channel quality for the cellular system may be quantified based on various metrics such as frame error rate (FER), packet error rate (PER), signal-to-noise ratio (SNR) on the downlink and/or uplink, received signal strength on the downlink and/or uplink, channel quality indicator (CQI), physical layer rate, transmit power headroom, etc. Poor channel quality may be quantified by a high frame/packet error rate, a low SNR, a weak received signal strength, a poor CQI, a low physical layer rate, a low transmit power headroom, etc.

Data performance for the cellular system may be quantified based on various metrics such as throughput, data latency/delay, peak data rate, guaranteed bit rate, transmit buffer size, happy bits, etc. Throughput may be indicative of an achieved data rate for a UE. Data latency/delay may be indicative of the amount of delay experienced by data sent by/to UE X. Transmit buffer size may be indicative of an amount of data to send by/to UE X. A happy bit is a bit sent by a UE to a base station to indicate the UE's satisfaction with an uplink grant for the UE. Unsatisfactory data performance may be quantified by a low throughput, a large data latency/delay, a low peak data rate, a low guaranteed bit rate, a large transmit buffer size, happy bits indicating dissatisfaction, etc.

Service charge/usage may be dependent on service subscription of UE X and/or other factors. High service charge/usage of UE X on the cellular system may result from UE X roaming in the cellular system and/or other reasons.

In one design, UE X may be switched from the WLAN system to the cellular system in the small cell based on one or more of the following factors:

C1. WLAN system is congested, e.g., running out of resources,
C2. UE has poor channel quality for the WLAN system,
C3. UE has unsatisfactory data performance via the WLAN system,
C4. UE has hidden node issue in the WLAN system,
C5. UE has poor efficiency/capability for the WLAN system, and
C6. Other factors.

Congestion in the WLAN system may be quantified based on various metrics such as wireless medium utilization, etc. Stations in the WLAN system may be time division multiplexed on a wireless medium, and only one station may transmit on the wireless medium at any given moment in order to avoid collisions between stations. Stations may contend for access to the wireless medium or may be scheduled for transmission on the wireless medium. Wireless medium utilization may be given by a percentage of time that the wireless medium is used by stations in the WLAN system in each predetermined time interval (e.g., each beacon interval of approximately 100 milliseconds).

Channel quality for the WLAN system may be quantified based on various metrics such as frame error rate, packet error rate, SNR, CQI, physical layer rate, etc. Poor channel quality may be quantified by a high frame/packet error rate, a low SNR, a poor CQI, a low physical layer rate, etc.

Data performance of UE X via the WLAN system may be quantified based on various metrics such as throughput, data latency/delay, peak data rate, etc. Unsatisfactory data performance may be quantified by a low throughput, a large data latency/delay, a low peak data rate, etc.

Hidden node issue may result from UE X being served by an access point and having one or more neighboring access points that cannot hear the serving access point of UE X. The serving access point and the neighboring access point(s) may then be unable to detect each another and may be hidden from one another. Collisions of transmissions at a receiver may occur as a result of multiple transmitting stations being hidden from one another. In one design, a hidden node scenario may be detected if the serving access point and its UEs observe significantly different wireless medium utilizations or hear different sets of neighboring nodes. To facilitate detection of hidden nodes, the serving access point may request its UEs to report observed wireless medium utilization and/or node identifiers (IDs) of neighboring access points detected by the UEs.

Efficiency or capability of UE X for the WLAN system may be quantified based on various metrics such as physical layer rate, goodput, supported security protocols, supported bandwidths, supported operating modes, etc. Goodput may refer to the percentage of packets decoded correctly (i.e., good packets) among transmitted packets.

The WLAN system and UE X may each support one or more standards in the 802.11 family of standards for WiFi. Each 802.11 standard supports a set of data rates, one or more system bandwidths, and one or more modulation techniques. For example, legacy 802.11 supports up to 2 megabits/second (Mbps) on 20 MHz system bandwidth with direct-sequence spread spectrum (DSSS) or frequency-hopping spread spectrum (FHSS). 802.11a supports up to 54 Mbps on 20 MHz with orthogonal frequency division multiplexing (OFDM). 802.11b supports up to 11 Mbps on 20 MHz with DSSS. 802.11g supports up to 54 Mbps on 20 MHz with OFDM and DSSS. 802.11n supports up to 150 Mbps on 20 or 40 MHz with OFDM. 802.11ac supports up to 867 Mbps on up to 160 MHz with OFDM.

The WLAN system and UE X may each support one or more security protocols such as Wired Equivalent Privacy (WEP), Wi-Fi Protected Access (WPA), and WPA version 2 (WPAv2). WEP is the original security protocol for WLAN and is the least secure. WPA is an improved security protocol for WLAN, and WPA2 is an enhanced security protocol over WPA. Each security protocol may support one or more authentication and/or encryption methods.

Poor efficiency or low capability of UE X in the WLAN system may be quantified by a low physical layer rate (e.g., for 802.11b), a low goodput, an outdated security protocol (e.g., WEP and/or WPA), inability to support 40 MHz operation by an access point (e.g., only support 20 MHz operation), no support of green-field format and reduced inter-frame spacing (IFS) (e.g., only support low-efficiency operation by an access point), etc.

In general, UEs may be switched between different wireless systems in the small cell based on any of the factors described above. One or more UEs may be considered for switching between wireless systems at any given moment. If multiple UEs are considered for switching, then these UEs may be prioritized and selected for switching based on their priorities.

UEs may be switched between wireless systems based on a set of factors, which may include one or more of the factors described above. The UEs may be switched based on the set of factors in various manners.

In a first design, the factors may be considered separately for switching UEs between wireless systems, e.g., one factor at a time. The factors may be arranged in order of importance. For example, factors A1 to A6 may be listed in order of importance, in accordance with one design, with factor A1 being the most important and factor A6 being the least important. The factors may also be assigned importance in some other order. UEs may be switched by considering one factor at a time, starting with the most important factor (e.g., factor A1, B1 or C1). For the factor being considered, UEs may be prioritized based on metrics related to the factor and may then be selected for switching based on the priorities of the UEs. The process may be repeated until all factors have been considered or some termination conditions are encountered (e.g., no more UEs left to switch).

In a second design, the factors may be jointly considered for switching. In this design, UEs may be switched by considering all of the factors together. For example, UEs may be prioritized based on metrics determined by a function of all factors being considered and may be selected for switching based on the priorities of the UEs.

In a third design, the factors may be arranged into groups, and one group of factors may be considered for switching at a time. Each group may include one or more factors. For example, a first group of factors may include factors related to the serving system, such as the factor related to congestion in the serving system. A second group of factors may include factors related to the UEs, such as factors related to data performance, channel quality, service charge/usage, efficiency, hidden node, etc. The groups of factors may be arranged in order of importance. For example, the first group of factors related to the serving system may be the most important, and the second group of factors related to the UE may be less important. The groups of factors may also be assigned importance in some other order. UEs may be switched by considering one group of factors at a time, starting with the most important group of factors. For the group of factors being considered, the UEs may be prioritized based on the group of factors being considered and may then be selected for switching based on the priorities of the UEs. The process may be repeated until all groups of factors have been considered or some termination factors are encountered. A metric may be defined for each group of factors based on a function of the factors in the group. For example, a system metric may be defined for the first group of factors related to the serving system. A UE metric may be defined for the second group of factors related to the UE.

In one design, switching manager 142 within small cell controller 140 in FIG. 1 may control switching of UEs between different wireless systems in small cell 120. Switching manager 142 may also switch UEs in wireless systems within small cell 120 to a wireless system external to small cell 120.

Figure 2:
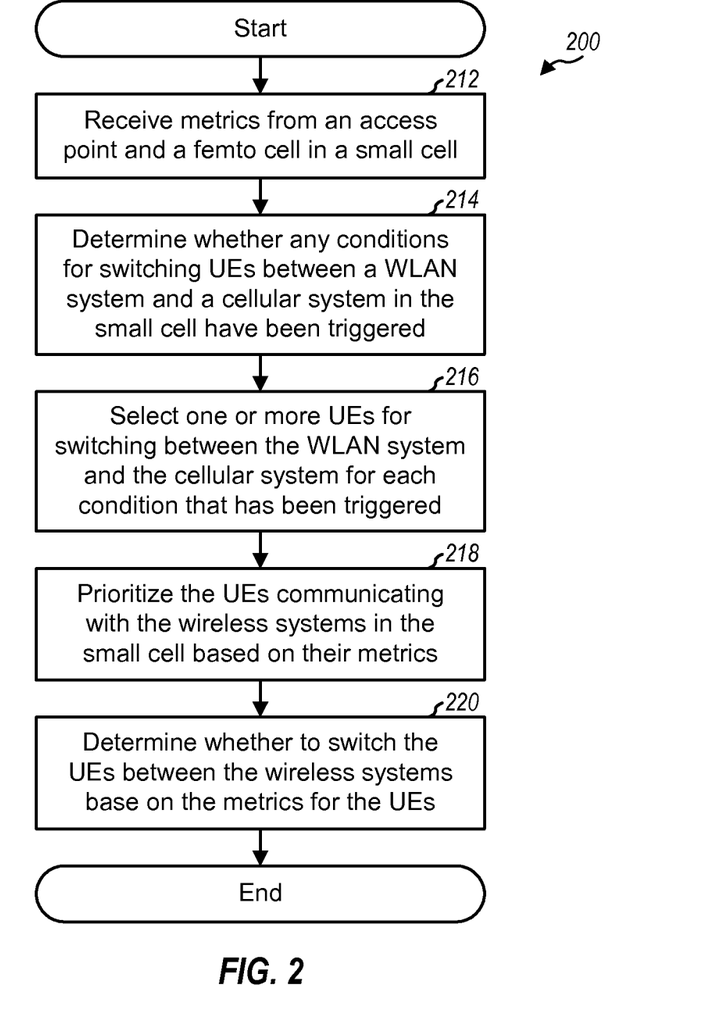
FIG. 2 shows a process for switching UEs between wireless systems.

FIG. 2 shows a design of a process 200 for switching UEs between wireless systems in a small cell. Process 200 may be performed by switching manager 142 in FIG. 1 or by some other entity. Switching manager 142 may receive metrics from access point 122 as well as femto cell 124 in small cell 120 (block 212). The metrics may include performance metrics, UE metrics, system metrics, etc. The UEs metrics may be related to attributes of the UEs such as data performance, channel quality, efficiency, service charge, etc. The system metrics may be related to attributes of the wireless system such as congestion, efficiency, etc. Some performance metrics may be related to the performance of the UEs and may also be considered as UE metrics. Some performance metrics may be related to the performance of the wireless system and may also be considered as system metrics.

Switching manager 142 may determine whether any factor for switching UEs between the WLAN system and the cellular system have been triggered, e.g., based on the metrics received from access point 122 and femto cell 124 (block 214). Switching manager 142 may select one or more UEs for switching between the WLAN system and the cellular system for each factor that has been triggered (block 216). These UEs may be identified based on the factor(s) being considered. For example, switching of UEs may be triggered by congestion in one of the plurality of wireless systems in the small cell. UEs communicating with the congested wireless system and being assigned a sufficient amount of resources in the congested wireless system (e.g., more than a threshold amount of resources) may be identified for possible switching.

Switching manager 142 may prioritize the UEs communicating with the plurality of wireless systems based on their metrics (block 218). In one design, UEs may be prioritized for switching as follows:
1. For switching triggered by congestion, UEs utilizing large amounts of system resource may be assigned higher priority and considered for switching first, and
2. For switching triggered by poor UE metrics, UEs with worse UE metrics may be considered for switching first.

UEs may also be prioritized in other manners. Switching manager 142 may determine whether to switch UEs between wireless systems base on the metrics for these UEs (block 220). For example, switching manager 142 may determine whether to switch UEs by taking into account (i) the performance of the UEs with respect to their serving systems and (ii) the capabilities of the UEs with respect to each available wireless system.

Triggers for switching UEs from the WLAN system to the cellular system in the small cell may also be applicable for switching UEs from the WLAN system to a wireless system external to the small cell. Switching UEs to an external wireless system may be desirable when the WLAN system and the cellular system in the small cell cannot provide satisfactory service to the UEs.

Figure 3:
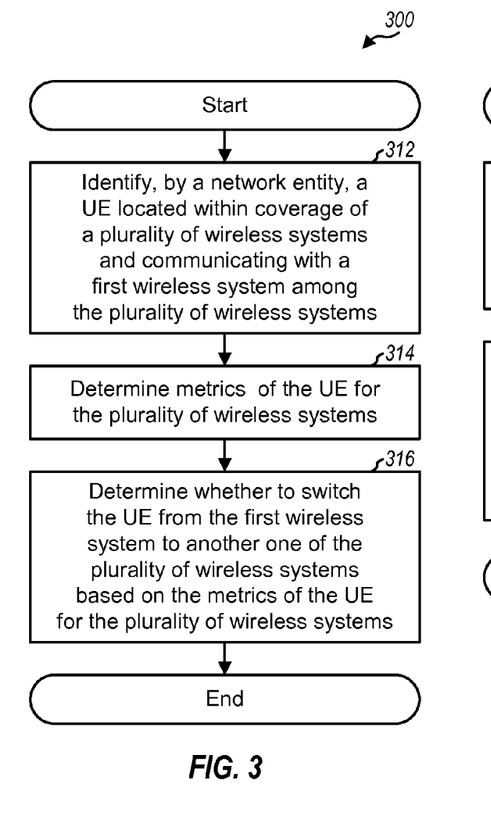
FIG. 3 shows another process for switching UEs between wireless systems.

FIG. 3 shows a design of a process 300 for switching UEs between wireless systems. Process 300 may be performed by a network entity, e.g., switching manager 142 or small cell controller 140 in FIG. 1 or some other entity. The network entity may identify a UE located within the coverage of a plurality of wireless systems and communicating with a first wireless system among the plurality of wireless systems (block 312). The network entity may determine metrics of the UE for the plurality of wireless systems (block 314). The metrics may be related to efficiency, or service charge, or service subscription, or application type, or buffer size, or some other parameter, or a combination thereof. The network entity may determine whether to switch the UE from the first wireless system to another one of the plurality of wireless systems based on the metrics of the UE for the plurality of wireless systems (block 316).

The plurality of wireless systems may comprise a WLAN system, a cellular system, some other wireless system, or a combination thereof. In one design, the plurality of wireless systems may be part of a small cell. In this design, the network entity may be part of the small cell and may be designated to switch UEs between the plurality of wireless systems. In another design, the plurality of wireless systems may include one or more wireless systems in a small cell and one or more wireless systems external to the small cell. In other designs, the plurality of wireless systems may include wireless systems deployed in any manner.

In one design of block 316, the network entity may determine switching priorities of the UE for the plurality of wireless systems based on the metrics of the UE for the plurality of wireless systems. A switching priority of the UE for each wireless system may indicate a priority of switching the UE from the first wireless system to said each wireless system. The network entity may determine whether to switch the UE from the first wireless system to another one of the plurality of wireless systems based on the switching priorities of the UE for the plurality of wireless systems. The network entity may also switch the UE (e.g., only) if the first wireless system experiences congestion. Congestion at the first wireless system may be determined based on available transmit power, or RSSI, or available resource blocks, or available orthogonal codes, or available channel elements at a base station in the first wireless system, or some other factor, or a combination thereof. Congestion may be determined for only the downlink, or only the uplink, or both the downlink and uplink.

In one design, the metrics of the UE for the plurality of wireless systems may comprise at least one performance metric related to efficiency of the UE for each of the plurality of wireless systems. The performance metric(s) relating to efficiency may comprise supported physical layer rate, or link budget, or supported security protocol, or supported system bandwidth, or supported operating modes for another one of the plurality of wireless systems, or some other metric, or a combination thereof. Link budget may be dependent on the number of antennas, pathloss, antenna gain, carrier frequency, etc. The UE may be assigned a higher priority for switching from the first wireless system to a second wireless system if the UE has higher efficiency for the second wireless system than the first wireless system. The UE may also be switched from the first wireless system to another wireless system if the UE has poor efficiency on the first wireless system, which may be quantified by efficiency below a low threshold.

In one design, the metrics of the UE for the plurality of wireless systems may comprise at least one metric related to service charge to the UE for communication with the first wireless system. The UE may be assigned a higher priority for switching from the first wireless system to a second wireless system if the UE has higher service charge on the first wireless system than the second wireless system.

In one design, the metrics of the UE for the plurality of wireless systems may comprise at least one metric related to service subscription of the UE on each of the plurality of wireless systems. The UE may be assigned a higher priority for switching from the first wireless system to a second wireless system if the UE has service subscription on the second wireless system.

In one design, the metrics of the UE for the plurality of wireless systems may comprise at least one metric related to application type of at least one active application of the UE on the first wireless system. The at least one active application may comprise a real-time application, or an application allowed only on the first wireless system, or both. The UE may be assigned a lower priority for switching from the first wireless system to another wireless system if the UE has an active real-time application and/or an active application allowed only on the first wireless system.

In one design, the metrics of the UE for the plurality of wireless systems may comprise at least one metric related to at least one buffer size of the UE. The at least one buffer size of UE may comprise (i) a transmit buffer size of a transmit buffer used to store traffic data being sent by the UE and/or (ii) a receive buffer size of a receive buffer used to store traffic data received by the UE. The UE may be assigned a higher priority for switching from the first wireless system to another wireless system if the transmit buffer size exceeds a first size and/or the receive buffer size exceeds a second size.

Figure 4:
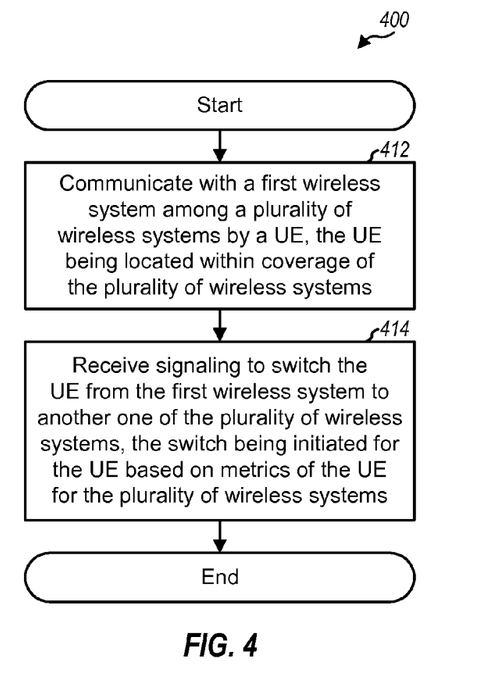
FIG. 4 shows a process for communicating by a UE.

FIG. 4 shows a design of a process 400 for communication. Process 400 may be performed by a UE (as described below) or by some other entity. The UE may be located within the coverage of a plurality of wireless systems and may communicate with a first wireless system among the plurality of wireless systems (block 412). The UE may receive signaling to switch the UE from the first wireless system to another one of the plurality of wireless systems (block 414). The switch may be initiated by a network entity for the UE based on metrics of the UE for the plurality of wireless systems. The metrics may be related to efficiency, service charge, service subscription, application type, buffer size, some other parameter, or a combination thereof. For example, the metrics may comprise at least one performance metric related to efficiency of the UE for each of the plurality of wireless systems, or at least one metric related to service charge to the UE for communication with the first wireless system, or at least one metric related to service subscription of the UE on each of the plurality of wireless systems, or at least one metric related to application type of at least one active application of the UE on the first wireless system, or at least one metric related to at least one buffer size of the UE, or a combination thereof.

In one design, the UE may be switched from the first wireless system to another one of the plurality of wireless systems based on switching priorities of the UE for the plurality of wireless systems. The switching priorities may be determined based on the metrics of the UE for the plurality of wireless systems.

Figure 5:
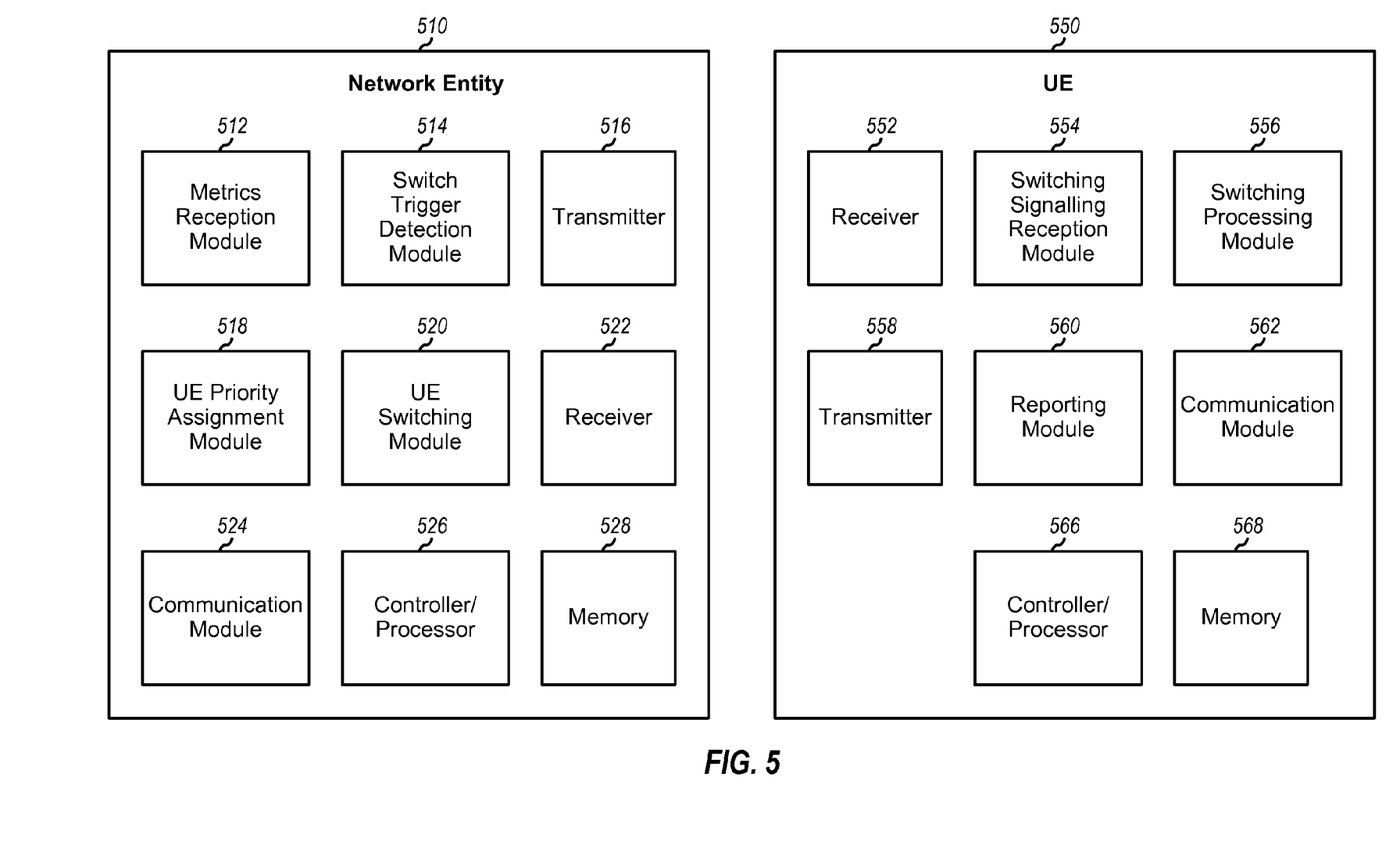
FIG. 5 shows a block diagram of a network entity and a UE.

FIG. 5 shows a block diagram of a design of a network entity 510 and a UE 550. Network entity 510 may be responsible for switching UEs between wireless systems and may correspond to switching manager 142 or small cell controller 140 in FIG. 1 or some other network entity. Network entity 510 may directly communicate with UE 550 or may communicate with UE 550 via one or more other entities. UE 550 may correspond to any of UEs 110 to 116 in FIG. 1.

At network entity 510, a module 512 may obtain metrics of UEs for a plurality of wireless systems, e.g., a WLAN system and a cellular system in a small cell. A module 514 may detect triggers for switching UEs between wireless systems. The switching triggers may be based on any of the metrics or factors described above and/or other metrics or factors. A module 518 may prioritize UEs for switching, e.g., based on the metrics of the UEs for the plurality of wireless systems. A module 520 may determine whether to switch UEs based on the switching priorities of the UEs. A module 524 may support communication with UEs and/or other network entities. A transmitter 516 may generate and send signals comprising control information such as switching decisions for UEs. A receiver 522 may receive and process signals sent by UEs and/or other network entities. The various modules within network entity 510 may operate as described above. A controller/processor 526 may direct the operation of various modules within network entity 510. A memory 528 may store data and program codes for network entity 510.

At UE 550, a module 554 may receive signaling indicating switching of UE 550 to a new wireless system. A module 556 may perform processing (e.g., connection setup, session configuration, etc.) to switch UE 550 to the new wireless system. A module 562 may report information such as performance metrics and/or UE metrics determined by UE 550. A module 562 may support communication with base stations and/or other network entities. A receiver 552 may receive and process downlink signals transmitted by base stations and/or other network entities. A transmitter 558 may generate and send uplink signals comprising information to send by UE 550. The various modules within UE 550 may operate as described above. A controller/processor 566 may direct the operation of various modules within base station 110x. A memory 568 may store data and program codes for UE 550.

Figure 6:
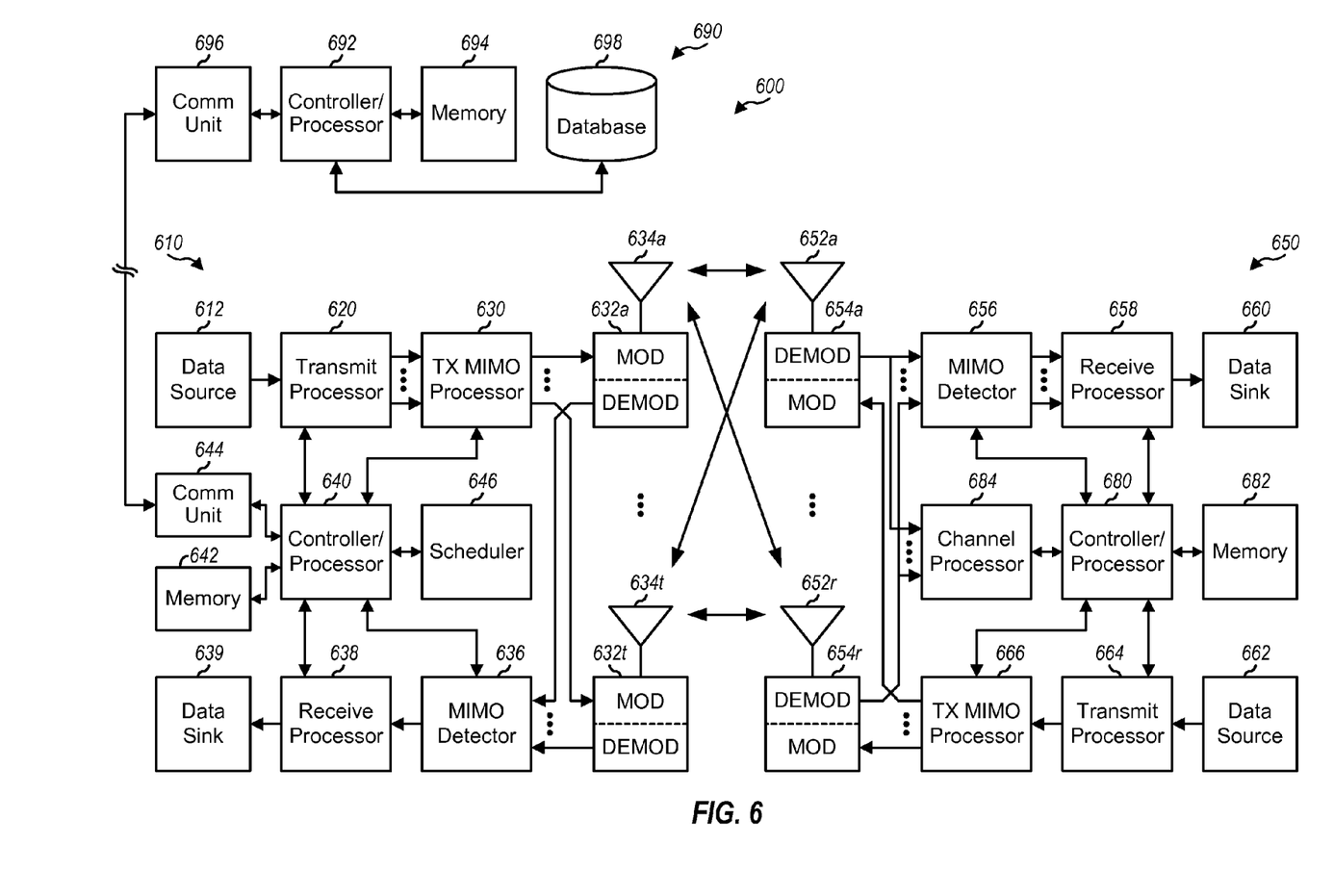
FIG. 6 shows a block diagram of a small cell and a UE.

FIG. 6 shows a block diagram of a small cell 600 and a UE 650. UE 650 may correspond to any of UEs 110 to 116 in FIG. 1. Small cell 600 may be one design of small cell 120 in FIG. 1 and may include a base station 610 and a small cell controller 690. Small cell controller 690 may correspond to small cell controller 140 in FIG. 1. Base station 610 may correspond to access point 122 or femto cell 124 in FIG. 1. Base station 610 may be equipped with T antennas 634a through 634t, and UE 650 may be equipped with R antennas 652a through 652r, where in general $T \geq 1$ and $R \geq 1$.

At base station 610, a transmit processor 620 may receive data from a data source 612 and control information (e.g., messages) from a controller/processor 640. Processor 620 may process (e.g., encode and modulate) the data and control information to obtain data symbols and control symbols, respectively. Processor 620 may also generate reference symbols for synchronization signals, reference signals, etc. A transmit (TX) multiple-input multiple-output (MIMO) processor 630 may perform spatial processing (e.g., precoding) on the data symbols, the control symbols, and/or the reference symbols, if applicable, and may provide T output symbol streams to T modulators (MODs) 632a through 632t. Each modulator 632 may process a respective output symbol stream (e.g., for OFDM, SC-FDMA, CDMA, etc.) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 650, antennas 652a through 652r may receive the downlink signals from base station 610 and other base stations. Antennas 652a through 652r may provide received signals to demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for SC-FDMA, OFDMA, CDMA, etc.) to obtain received symbols. A MIMO detector 656 may obtain received symbols from all R demodulators 654a through 654r, perform MIMO detection on the received symbols if applicable, and provide detected symbols. A receive processor 658 may process (e.g., demodulate and decode) the detected symbols, provide decoded data for UE 650 to a data sink 660, and provide decoded control information to a controller/processor 680. A channel processor 684 at UE 650 may receive downlink signals from base station 610 and/or other base stations. Processor 680 may determine channel quality for base station 610 and/or other base stations based on the received downlink signals.

On the uplink, at UE 650, a transmit processor 664 may receive data from a data source 662 and control information (e.g., messages) from controller/processor 680. Processor 664 may process (e.g., encode and modulate) the data and control information to obtain data symbols and control symbols, respectively. Processor 664 may also generate reference symbols for reference signals. The symbols from transmit processor 664 may be precoded by a TX MIMO processor 666 if applicable, further processed by modulators 654a through 654r (e.g., for OFDMA, SC-FDMA, CDMA, etc.), and transmitted to base station 610 and other base stations. At base station 610, the uplink signals from UE 650 and other UEs may be received by antennas 634, processed by demodulators 632, detected by a MIMO detector 636 if applicable, and further processed by a receive processor 638 to obtain decoded data and control information sent by UE 650 and other UEs. Processor 638 may provide the decoded data to a data sink 639 and the decoded control information to controller/processor 640.

Controllers/processors 640 and 680 may direct the operation at base station 610 and UE 650, respectively. Processor 680 and/or other processors and modules at UE 650 may perform or direct process 400 in FIG. 4 and/or other processes for the techniques described herein. Processor 640 and/or other processors and modules at base station 610 may perform or direct process 200 in FIG. 2, process 300 in FIG. 3, and/or other processes for the techniques described herein. Memories 642 and 682 may store data and program codes for base station 610 and UE 650, respectively. A communication (Comm) unit 644 may enable base station 610 to communicate with other network entities. A scheduler 646 may schedule UEs for communication and may assign resources to the scheduled UEs.

Within small cell controller 690, a controller/processor 692 may perform various functions to support communication for UEs. Processor 692 and/or other processors and modules at small cell controller 690 may perform or direct process 200 in FIG. 2, process 300 in FIG. 3, and/or other processes for the techniques described herein. A memory 694 may store program codes and data for small cell controller 690. A storage unit 694 may store information for UEs and/or wireless systems within the control of small cell controller 690. A communication unit 696 may enable small cell controller 690 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication using multiple co-existence wireless systems having overlapping coverage and which form part of a small cell, comprising:
identifying, by a small cell controller for the small cell, a user equipment (UE) located within coverage of the multiple co-existence wireless systems and communicating with a first wireless system of the multiple co-existence wireless systems;
determining, by the small cell controller, metrics of the UE for the multiple co-existence wireless systems, the metrics being related to efficiency, or service charge, or service subscription, or application type, or buffer size, or a combination thereof; and
determining, by the small cell controller, whether to switch the UE from the first wireless system to another one of the multiple co-existence wireless systems based on the metrics of the UE for the multiple co-existence wireless systems.

2. The method of claim 1, further comprising:
determining switching priorities of the UE for the multiple co-existence wireless systems based on the metrics of the UE for the multiple co-existence wireless systems, wherein a switching priority of the UE for each wireless system indicates a priority of switching the UE from the first wireless system to said each wireless system; and
wherein the determining whether to switch the UE comprises determining whether to switch the UE from the first wireless system to another one of the multiple co-existence wireless systems based on the switching priorities of the UE for the multiple co-existence wireless systems.

3. The method of claim 2, further comprising:
switching the UE from the first wireless system to another one of the multiple co-existence wireless systems based on the switching priorities if the first wireless system experiences congestion.

4. The method of claim 3, wherein congestion at the first wireless system is determined based on available transmit power, or received signal strength indicator (RSSI), or available resource blocks, or available orthogonal codes, or available channel elements at a base station in the first wireless system, or a combination thereof.

5. The method of claim 1, wherein the metrics of the UE for the multiple co-existence wireless systems comprise at least one performance metric related to efficiency of the UE for each of the multiple co-existence wireless systems.

6. The method of claim 5, wherein the at least one performance metric related to efficiency of the UE comprises supported physical layer rate, or link budget, or supported security protocol, or supported system bandwidth, or supported operating modes for another one of the multiple co-existence wireless systems, or a combination thereof.

7. The method of claim 5, wherein the UE has a higher priority for switching from the first wireless system to a second wireless system if the UE has higher efficiency for the second wireless system than the first wireless system.

8. The method of claim 5, further comprising:
switching the UE from the first wireless system to another one of the multiple co-existence wireless systems if the UE has poor efficiency on the first wireless system.

9. The method of claim 1, wherein the metrics of the UE for the multiple co-existence wireless systems comprise at least one metric related to service charge to the UE for communication with the first wireless system.

10. The method of claim 1, wherein the UE is assigned a higher priority for switching from the first wireless system to a second wireless system if the UE has higher service charge on the first wireless system than the second wireless system.

11. The method of claim 1, wherein the metrics of the UE for the multiple co-existence wireless systems comprise at least one metric related to service subscription of the UE on each of the multiple co-existence wireless systems.

12. The method of claim 1, wherein the UE is assigned a higher priority for switching from the first wireless system to a second wireless system if the UE has service subscription on the second wireless system.

13. The method of claim 1, wherein the metrics of the UE for the multiple co-existence wireless systems comprise at least one metric related to application type of at least one active application of the UE on the first wireless system.

14. The method of claim 13, wherein the at least one active application of the UE on the first wireless system comprises a real-time application, or an application allowed only on the first wireless system, or both, and wherein the UE is assigned a lower priority for switching from the first wireless system to another wireless system if the UE has an active real-time application, or an active application allowed only on the first wireless system, or both.

15. The method of claim 1, wherein the metrics of the UE for the multiple co-existence wireless systems comprise at least one metric related to at least one buffer size of the UE.

16. The method of claim 15, wherein the at least one buffer size of the UE comprises a transmit buffer size of a transmit buffer used to store traffic data being sent by the UE, or a receive buffer size of a receive buffer used to store traffic data received by the UE, or both, and wherein the UE is assigned a higher priority for switching from the first wireless system to another wireless system if the transmit buffer size exceeds a first size, or the receive buffer size exceeds a second size, or both.

17. The method of claim 1, wherein the multiple co-existence wireless systems comprise a wireless local area network (WLAN) system and a cellular system.

18. The method of claim 1, wherein the multiple co-existence wireless systems are part of a small cell designated to switch UEs between the multiple co-existence wireless systems.

19. An apparatus for wireless communication using multiple co-existence wireless systems having overlapping coverage and which form part of a small cell, comprising:
at least one processor configured to:
identify, by a small cell controller for the small cell, a user equipment (UE) located within coverage of the multiple co-existence wireless systems and communicating with a first wireless system of the multiple co-existence wireless systems;
determine, by the small cell controller, metrics of the UE for the multiple co-existence wireless systems, the metrics being related to efficiency, or service charge, or service subscription, or application type, or buffer size, or a combination thereof; and
determine, by the small cell controller, whether to switch the UE from the first wireless system to another one of the multiple co-existence wireless systems based on the metrics of the UE for the multiple co-existence wireless systems.

20. The apparatus of claim 19, wherein the at least one processor is configured to:

determine switching priorities of the UE for the multiple co-existence wireless systems based on the metrics of the UE for the multiple co-existence wireless systems, wherein a switching priority of the UE for each wireless system indicates a priority of switching the UE from the first wireless system to said each wireless system; and determine whether to switch the UE from the first wireless system to another one of the multiple co-existence wireless systems based on the switching priorities of the UE for the multiple co-existence wireless systems.

21. The apparatus of claim 20, wherein the at least one processor is configured to switch the UE from the first wireless system to another one of the multiple co-existence wireless systems based on the switching priorities if the first wireless system experiences congestion.

22. An apparatus for wireless communication using multiple co-existence wireless systems having overlapping coverage and which form part of a small cell, comprising:

means for identifying, by a small cell controller for the small cell network entity, a user equipment (UE) located within coverage of the multiple co-existence wireless systems and communicating with a first wireless system of the multiple co-existence wireless systems;

means for determining, by the small cell controller, metrics of the UE for the multiple co-existence wireless systems, the metrics being related to efficiency, or service charge, or service subscription, or application type, or buffer size, or a combination thereof; and means for determining, by the small cell controller, whether to switch the UE from the first wireless system to another one of the multiple co-existence wireless systems based on the metrics of the UE for the multiple co-existence wireless systems.

23. The apparatus of claim 22, further comprising:

means for determining switching priorities of the UE for the multiple co-existence wireless systems based on the metrics of the UE for the multiple co-existence wireless systems, wherein a switching priority of the UE for each wireless system indicates a priority of switching the UE from the first wireless system to said each wireless system; and wherein the means for determining whether to switch the UE comprises means for determining whether to switch the UE from the first wireless system to another one of the multiple co-existence wireless systems based on the switching priorities of the UE for the multiple co-existence wireless systems.

24. The apparatus of claim 23, further comprising:

means for switching the UE from the first wireless system to another one of the multiple co-existence wireless systems based on the switching priorities if the first wireless system experiences congestion.

25. A a non-transitory computer-readable medium comprising:

code for causing at least one processor to identify, by a small cell controller for a small cell, a user equipment (UE) located within coverage of a multiple co-existence wireless systems having overlapping coverage and forming part of the small cell and communicating with a first wireless system of the multiple co-existence wireless systems;

code for causing the at least one processor to determine, by the small cell controller, metrics of the UE for the multiple co-existence wireless systems, the metrics being related to efficiency, or service charge, or service subscription, or application type, or buffer size, or a combination thereof; and code for causing the at least one processor to determine, by the small cell controller, whether to switch the UE from the first wireless system to another one of the multiple co-existence wireless systems based on the metrics of the UE for the multiple co-existence wireless systems.

* * * * *